United States Patent [19]

Fujimori et al.

[11] 4,258,242
[45] Mar. 24, 1981

[54] WELDING PROCESS FOR PRODUCTION OF A STEEL PIPE

[76] Inventors: Shigeo Fujimori, 645-128, Takamori, Isehara-shi, Kanagawa-ken; Tohru Saito, 3-4, Kyowa 3-chome, Sagamihara-shi, Kanagawa-ken; Kozaburo Otani, 9-6, Yokodai 2-chome, Sagamihara-shi, Kanagawa-ken; Taizi Nagatani, 2-21, Kyowa 3-chome, Sagamihara-shi, Kanagawa-ken, all of Japan

[21] Appl. No.: 940,892

[22] Filed: Sep. 11, 1978

[30] Foreign Application Priority Data

Jun. 30, 1978 [JP] Japan .................... 53-79648

[51] Int. Cl.³ ............................................. B23K 31/06
[52] U.S. Cl. .................................. 219/61; 219/76.16; 219/59.1; 219/137 R
[58] Field of Search ................... 219/61, 60 R, 137 R, 219/76.12, 76.16, 121 P, 75; 228/165

[56] References Cited

U.S. PATENT DOCUMENTS

| | | | |
|---|---|---|---|
| 3,531,619 | 9/1970 | Broodman | 219/137 R |
| 3,732,393 | 5/1973 | Karo et al. | 219/137 R |
| 3,832,522 | 8/1974 | Arikowa et al. | 219/137 R |
| 4,091,258 | 5/1973 | Wilkens et al. | 219/137 R |
| 4,146,773 | 3/1979 | Willems et al. | 219/76.16 |
| 4,147,917 | 4/1979 | Jelmorini | 219/76.16 |

FOREIGN PATENT DOCUMENTS

| | | |
|---|---|---|
| 51-61452 | 5/1976 | Japan . |
| 51-92750 | 8/1976 | Japan . |
| 52-80256 | 1/1971 | Japan . |
| 53-61453 | 4/1978 | Japan . |

*Primary Examiner*—B. A. Reynolds
*Assistant Examiner*—M. Paschall
*Attorney, Agent, or Firm*—Wenderoth, Lind & Ponack

[57] ABSTRACT

Disclosed herein is an improvement of a welding process for welding a steel pipe, wherein a gas metal arc welding is performed to form the first welding layer and a submerged arc welding is performed to form the last welding layer. According to the conventional gas metal arc welding process, i.e. the MIG or $CO_2$ welding processes, the combined use of a high welding current and a welding wire having a small diameter is known to bring about the rotation of the welding arc and the formation of an undercut along the toe of the weld metal. The purpose of the present invention is to weld a steel pipe having either a large thickness or an excellent ductility at a temperature of less than $-40°$ C., or both. According to the present invention, the combined use of a high welding current and a wire having a small diameter is possible, by employing a gas mixture containing an inert gas as a major part thereof and $CO_2$ as an additional part thereof as a shielding gas. In addition, by adequately selecting the wire extension, the gas metal arc welding is improved to provide the features of: deep and round penetration; stable arc formation with stiffness of the arc, and; high metal deposition rate.

9 Claims, 8 Drawing Figures

Fig. 1
(A)
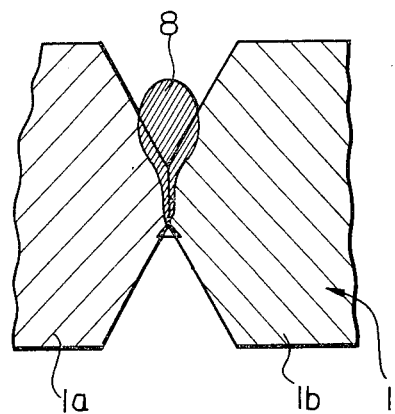
(B)
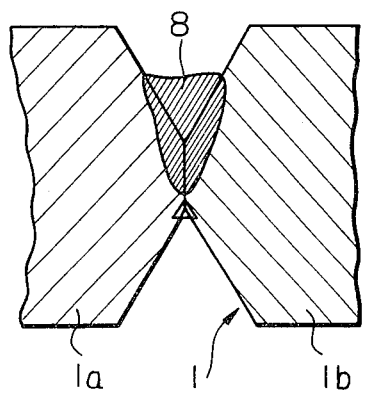

Fig. 3
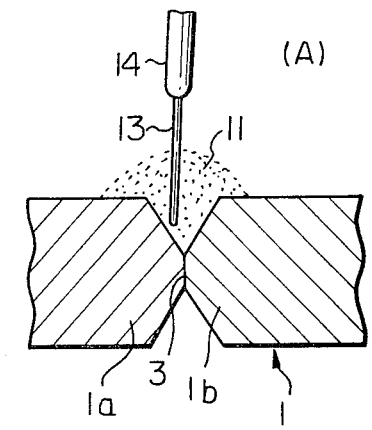
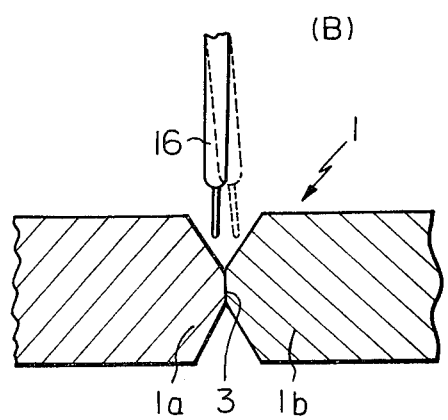

WELDING PROCESS FOR PRODUCTION OF A STEEL PIPE

The present invention relates to a welding process for producing a steel pipe, and more particularly, a welding process according to which a high quality steel pipe, particularly a steel pipe having a large wall thickness, is welded at a high production rate.

Steel pipes with a large diameter are generally produced by a UOE process, a spiral process or a bending roller process, and these processes include a welding step. However, with regard to the welding step, there are presently widespread demands for a practical welding process to attain a high welding speed, and thus a high production efficiency, as well as a superior quality of the steel pipes.

When a steel pipe having a large diameter for use as a pipeline for transporting petroleum or natural gas is produced by seam welding, a submerged arc welding process, hereinafter abbreviated as an SAW process, is usually adopted.

In the SAW welding in order to ensure the dimensional accuracy required for the pipes and to simplify the welding step, the base metal (1), as seen FIG. 3A, is closely engaged at its ends (1a) and (1b) at root face (3), which is formed at these ends, so that a groove without a root gap is formed between these ends. Reference numerals 11, 13 and 14 designate the flux, the welding wire, and current contact tip, respectively. In the SAW process, from the point of view of production efficiency and economy, a multi electrode system with two or three electrodes has heretofore been used and the welding is carried out in one pass. The SAW process is believed by experts in the welding art to be superior to a gas metal arc welding process and the other welding processes from the point of view of coming closest to the production of seamless-pipes. This is because the penetration and the bead shape are excellent, even at a high welding speed, due to a high welding heat input, and further, the production efficiency is high because of a high metal deposition rate per unit time. The term "gas metal arc-welding" is a term used in the welding art which collectively designates: MIG welding, in which a shield gas of an inert gas with, usually, oxygen present in a small amount is used; carbon dioxide, arc-welding; and consumable electrode-arc-welding, in which a gas mixture of carbon dioxide, an inert gas and a small amount of oxygen is employed for the shielding gas. Gas metal arc welding is hereinafter referred to as GMA welding.

Improved toughness, for example higher than 3.5 kg.m at −60° C., of the weld zone of large diameter steel pipes for use as pipelines has recently been required, because the pipelines are being more frequently constructed in cold climate regions than before. In order to produce a steel pipe having a large wall thickness at a high production efficiency by the SAW process with multiple electrodes, the welding is carried out at a high welding heat input of more than 60,000 Joule/cm when the plate thickness amounts to 25 mm. As a result of such a large welding heat input, the quality of the base metal is cause to deteriorate, for example, the impact property is reduced at the heat affected zone of the base metal.

In a case where no measure is employed for providing the steel material with a satisfactory low temperature toughness and such an ordinary steel material as stipulated an API Standard 5L is welded by the SAW process, the welding heat input is limited to a low level so as to achieve the toughness at low temperature, and thus, multi-layer welding is necessary for the welding operation. As a consequence of limited welding heat input, the amount of deposited metal per unit time is also reduced, and therefore, the production efficiency is reduced. In addition, the weld metal of the first layers which are formed on the inner and outer surfaces of the pipe includes the root run pass of the first layers at which the weld metal is apt to be brittle due to stress-relief annealing. In order to avoid the SR (stress relief) embrittlement, an additional step of back chipping is necessary, and the production efficiency is further reduced by the back chipping.

The GMA process has heretofore been tried as an alternative for the SAW process, in order to find a way of welding a steel pipe at a high production efficiency, guaranteeing required toughness at low temperature, without using a special kind of steel material. According to the ordinary GMA welding process, the welding is carried out by means of an electrode wire with a relatively small diameter, ranging from 0.8 to 2.0 mm, and the disadvantages of the process are generally stated to be: (1) the amount of deposited metal per unit time, and thus the welding efficiency, is not very high; (2) the penetration depth is shallow; and (3) welding defects are liable to be formed due to bead shape.

The welding efficiency will now be explained with reference to FIG. 2 which shows the relationship between the welding current (I) and the wire diameter (d). In the conventional MIG welding process with a small diameter wire, the welding current generally used is in the range between the —Δ—lines which represent the maximum and minimum currrent values, respectively. In addition, in the GMA welding process using carbon dioxide gas as the shielding gas, the welding current used is in the range between the ———o———lines representing the maximum and minimum current values in FIG. 2. However, the upper, high current part of this range used for the GMA welding with $CO_2$ gas is adopted mainly for tack welding and, therefore, the lower part below the two dot chain line shown in FIG. 2 and representing $I = 250 \cdot d$ is used for ordinary GMA welding. The relatively small amount of metal deposition per unit time is related to the welding current ranges mentioned above.

With regard to the penetration depth, in the common MIG welding process this depth presents no difficulties, because the MIG welding is usually carried out at a low welding speed of less than 50 cm/min, and further, the small diameter wire used in common MIG welding produces a good concentration of the arc. However, since a high welding speed of more than 50 cm/min is required for the production of a steel pipe, the penetration depth is reduced to a rather low level in connection with the current value mentioned above. The common MIG welding process with a small diameter wire, described above, produces a bead shape as illustrated in FIG. 1(A). As seen in FIG. 1(A), the bead has a bottom part which is extremely narrow and is elongated and a top part which has a convex form, which is also narrow. Since the width of the penetration portion is small at the bottom part of the bead (8), a slight deviation of either the seam tracking or orientation of the arc may result in an incomplete penetration at the root face (3). In addition, since the cross sectional shape of the bead is longitudinally elongated, such welding defects as hot cracking and lack of fusion are liable to be generated.

Another of the GMA welding processes, i.e. the known MIG welding process in which a high welding current is passed through a small diameter wire, will now be explained. When the high welding current is passed through the small diameter wire, the zone of the base metal heated by the arc may not be sufficient for welding the pipe, and the shape of the deposited metal is longitudinally elongated and narrower than the shape of the metal (8) formed by the conventional MIG welding process with a small diameter wire (FIG. 1(A)). The weld metal of the thus formed convex shaped bead may not achieve complete fusion at the toe of weld and cause an undercut along the bead. It is difficult to utilize the narrow protruding part of the penetration portion for the penetration to the root face (3) of the ends (1a, 1b) of the base metal (1), because the so-called finger shaped penetration portion obtained by the MIG welding process with a high current and a small diameter wire is so narrow and elongated that the narrow protruding part of the penetration portion penetrates in a deep but very narrow penetration. In addition, hot cracking is liable to occur, partly because the deposited metal (8) is longitudinally elongated, as seen in a cross sectional illustration of the metal in FIG. 1(A), and partly because the cooling speed of the deposited metal is high.

In addition to the reasons set forth above, because of the following reasons it is impossible to perform MIG welding by using a high current for a small-diameter wire. This is because, when the welding is carried out by the use of a high current for a small diameter wire, the so-called rotation phenomena of the arc are induced, which results in spatter, shallow penetration and a non-alignment of the bead. Consequently, a welding current which depends upon the wire diameter in the ranges between the two lines —Δ—, as stated before, is used.

Japanese Laid Open Patent Specification No. 51-61452 and Japanese Published Patent Specification No. 53-9571 propose a GMA welding process, according to which process a high welding current and a large diameter wire are used to enhance the quality and the production rate of thick wall pipe. In this process, the high current and the large diameter wire are combined to reduce the current density in the wire, and thus the pinch force of the current, thereby ensuring the spread of the arc, improving the bead shape and achieving enough penetration due to the high current. In the GMA welding process with a high electrical current, the current density in the large diameter wire is low, despite the high electrical current, and therefore, the arc may not be stable in the groove during the welding due to low arc stiffness. For example, when the ordinary GMA welding is carried out by passing 300 A through a wire of 1.2 mm in diameter is compared with GMA welding with a high current carried out by passing 800 A through a wire 4.0 mm in diameter, the current densities in the former and latter weldings are 256 A/mm$^2$ and 64 A/mm$^2$, respectively. The current density in the large-diameter wire is considerably lower than that in the small-diameter wire. Accordingly, the uni-directional property of the welding arc is deficient in the latter welding and the arc stability in the groove is thus poor. This arc instability is liable to cause welding defects, such as a lack of fusion, because the arc is even more unstable at a large current, due to the magnetic blow which is induced by the direct current used in the GMA welding process as a power source, and further, because the area of generation of the arc at the tip end of the wire has a poor stability due to the large diameter of the wire. In conclusion, the main purpose of the GMA welding process with a large diameter wire is to reduce the electrical current density, and thus the pinch force, so that the arc stiffness is low. As a result of the low pinch force, the magnetic blow is likely to occur and the arc is likely to deflect. In addition, with regard to the penetration, the penetration obtained is not very deep because of the low current density. Furthermore, the specific melting rate of wire relative to the current is inferior to that of the common GMA welding process with a large diameter wire. Since the last welding layer is formed on the widest part of the groove, such problems as lack of width or a bad shape of the bead, and also, lack of fusion, undercut and non alignment of the reinforcement of the weld result. The shortcoming of the GMA welding process using a high current and a large diameter wire as compared to the SAW process, is that such problems as mentioned above arise.

Japanese Laid Open Patent Specification No. 51-92750 proposes a welding process in which intermediate welding beads (6) and (9), as illustrated in FIG. 5, are formed by a GMA welding process and beads (7) and (10) are deposited by a SAW process on the beads (6) and (9), respectively, to a thickness of from 2 to 7 mm. In this welding process, the intermediate beads (6) and (9), i.e. the last beads formed by the GMA welding, have a cross sectional shape which is convex and narrow, as explained before in connection with the GMA welding process with a small-diameter wire, and further, have a lack of fusion at the toe of the weld. In addition, the beads (7) and (10) spread laterally with a depth of from 2 to 7 mm. As a result, the beads (7) and (10) achieve very low penetration, and a lack of fusion (12) as shown in FIG. 5 is liable to occur due to the formation of thin beads (7, 10) on the beads (6) and (9), respectively. In addition, the last layer formed by the SAW process has a small thickness of 2 to 7 mm, and it is necessary to form the beads in the groove close to the pipe surface by the GMA welding process in which the metal deposition rate, and thus, the welding efficiency are usually low.

Japanese Laid Open Patent Specification No. 52-3543 discloses a welding process in which the last welding layer is formed by the SAW process subsequently to the GMA welding process, as in the Japanese Laid Open Patent Specification No. 51-92750. However, in the welding process of the Laid Open Specification No. 52-3543, during the SAW process forming the last layer an electrode having a rectangular cross section is positioned so that the long sides of the electrode are substantially perpendicular to the welding line. The rectangular electrode is used in the SAW process with a relatively low welding heat input to stably form a surface bead which is thin but wide. In the Japanese Laid Open Patent Specification No. 52-3543 no measure is disclosed to eliminate the lack of fusion (12) shown in FIG. 5. The GMA welding process of the Japanese Laid Open Patent Specification No. 52-3543 is carried out at a low electrical current density as in the Japanese Laid Open Patent Specification No. 51-61452 and Japanese Published Patent Specification No. 53-9571, which involve the difficulties explained before.

It is an object of the present invention to provide a welding process for producing steel pipe of high quality at a high production efficiency.

The present invention involves the concept of: using a small diameter wire, i.e. a consumable, small-diameter wire, for improving the toughness of the weld zone of a steel pipe at low temperature; using a welding current considerably higher than that conventionally used for the small diameter wire; and using as the shielding gas atmosphere for the GMA welding process a gas mixture in which carbon dioxide gas is added to and mixed with the inert gas as the major part of the gas mixture. As a result, deep penetration with enough extension is achieved and the width of the heated zone of the base metal is large, and thus, excellent first layer beads are stably provided.

The GMA welding process for producing the first-layer beads is combined with the SAW process for the last layer, according to which the surface appearance of the beads is excellent, the shape of the toe of the weld is good, and a smooth surface contour is easily obtained. As a result of such combination, an excellent quality of the weld zone of the steep pipe can be provided at high welding speed and high production efficiency.

In accordance with the present invention, there is provided a welding process for the production of a steel pipe, comprising the steps of:

abutting the chamfered ends of a metal plate to define a grooved joint;

performing a gas metal arc (GMA) welding on said joint under an atmosphere of a shielding gas for forming a first welding layer on the abutted and grooved ends of a steel plate; and performing a submerged arc welding and, forming the last welding layer, the process being characterized in that;

in the gas metal arc (GMA) welding step, (1) a high electrical current (I) in the range defined by the formula:

$$500d \geq I \geq 500d - 150,$$

wherein I is in amperes and d indicates the diameter of the consumable welding wire in mm, is conducted through a small diameter wire having a diameter of from 0.8 to 2.4 mm, within an atmosphere of a gas mixture containing mainly an inert gas and, additionally, carbon dioxide, whereby the conduction of said current through said wire within said atmosphere suppresses the generation of a rotating arc, generates a stiffened arc due to the pinch force produced by the high current density, ensures the resistance of the arc against the deflection from magnetic blow, and enhances the penetration to the base metal, and (2), the length of the wire (*l*) in mm between the end of the current contact tip and the bottom of the groove is according to the formula:

$$l > 10d + 5,$$

so that the deposition rate of molten metal is essentially increased by a long wire. It is preferable that the arc be oscillated in a direction traversing the weld line at a rate of from 3 to 30 Hz and at an amplitude of from 1 to 15 mm.

The present invention will illustrated in detail by comparison with the prior art and in connection with the drawings, wherein:

FIGS. 1 (A) and 1 (B) illustrate a cross sectional view of the weld zone of a pipe as well as the penetration and the bead shape, when GMA welding is carried out by applying a high electrical current to a small-diameter wire, FIG. 1 (A) corresponding to the conventional process and FIG. 1 (B) corresponding to the process according to the present invention, respectively;

FIG. 2 is a graph which shows the relationship between the wire diameter (d) in mm and the welding current (I) in amperes;

FIG. 3 (A) schematically illustrates a cross sectional view of the set-up of a conventional SAW process;

FIG. 3 (B) is a view the same as in FIG. 3 (A) and illustrates an embodiment of the GMA welding process according to the present invention;

Figure 5:
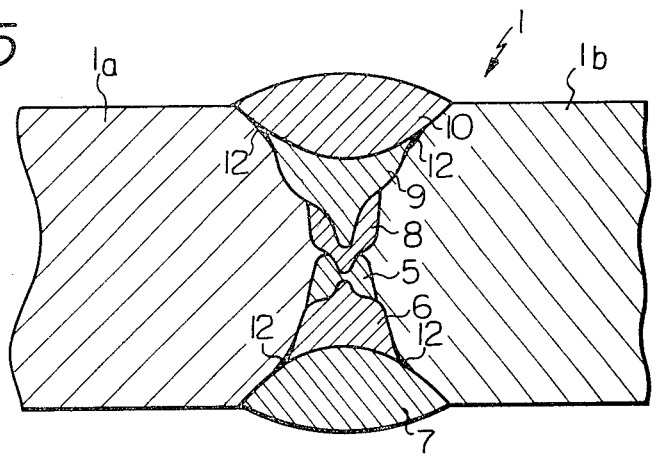
Figure 6:
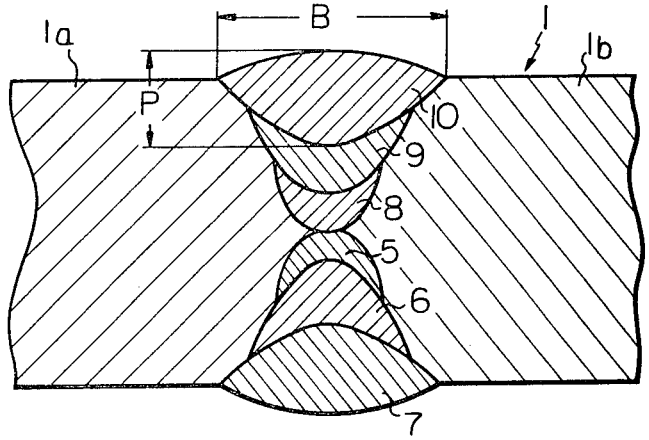
Figure 7:
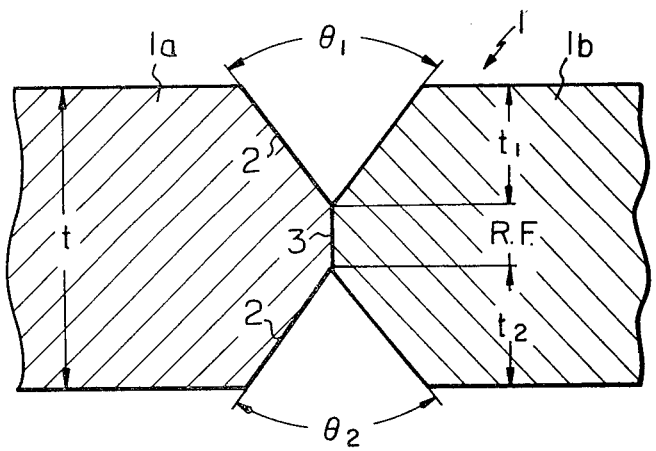
Figure 8:
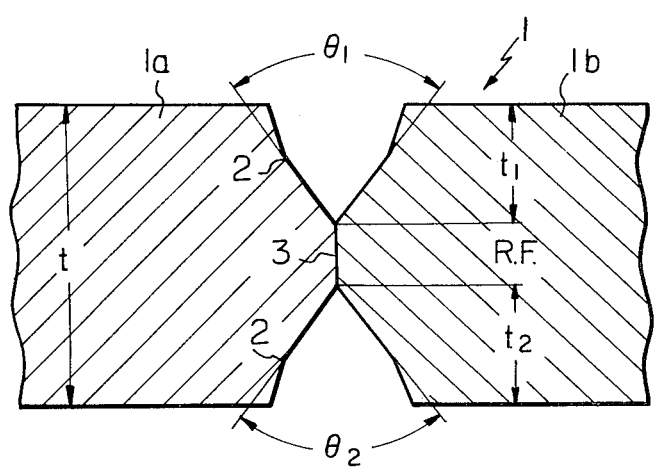

FIG. 5 schematically illustrates a cross sectional view of the beads build up by a conventional GMA welding process together with a SAW process;

FIG. 6 schematically illustrates a cross sectional view of the weld metal build up according to the present invention, and;

FIGS. 7 and 8 schematically illustrate the double groove shapes used in welding for the production of pipe.

According to the present invention, a small-diameter wire having a diameter ranging from 0.8 to 2.4 mm, preferably from 1.2 to 1.6 mm, is fed at a high speed, for example from 25 to 35 m/min, for example, for a 1.2 mm diameter wire; a shielding gas atmosphere is provided which contains an inert gas as a major part thereof and carbon dioxide gas as an additional part thereof and a welding current is adjusted to a high level in such a manner as to produce a spraying arc with a high current density according to the formula:

$$500d \geq I \geq 500d - 150 \qquad (1)$$

where I is current in amps and d is wire diameter in mm.

The inert gas is at least one member selected from the group consisting of argon and helium, but argon is commonly used. The welding current according to the formula (1) is at a current density ranging from 400 to 530 A/mm², for example, for a 1.2 mm diameter wire. Such a high current or current density has been deemed to be unsuitable for welding, as stated above. When a large current is used in combination with the small diameter wire in the conventional MIG welding process, the wire becomes plastic due to the resistance heating in the wire and the form of the wire tip end is changed into a long conical shape. Consequently, as is known by experts in the art, the arc is changed to a rotating spray arc, with the result that spatter at an appreciable level, shallow penetration and non-alignment of the bead shape occur. However, according to the present invention, since carbon dioxide gas is added to the shielding gas so as to form a shielding gas mixture, the conical shape of the wire tip end is shortened and the rotating spray arc is suppressed. It is accordingly possible to take advantage of a so-called stiffened arc squeezed to a thin shape by the pinch force. Deep penetration is provided due to the fact that the arc is stiffened and thin, and the resistance of the arc to magnetic blow and deflection is enhanced due to the fact that the arc is stiffened by the pinch force. Furthermore, the amount of metal deposition per unit time, and thus the welding efficiency is increased due to the high welding current. The shielding gas may contain a small amount of oxygen without producing any effect on the advantages mentioned above.

The welding current (I) in amperes is selected, depending upon the wire diameter (d) in mm, within the range defined by the formula:

$$500d \geq I \geq 500d - 150,$$

for the following reasons. The wire is long according to the present invention, enough pinch force is exerted on the arc column, and the wire is oscillated according to a preferable feature of the present invention. The relationship $500d \geq I$ must be satisfied in order to avoid abnormal vibration of the wire tip end of the wire and the arc. If the welding current exceeds 500d, the resistance heating becomes excessive and brings about abnormal vibration. In other words, if the welding current (I) exceeds the upper limit and becomes too high, the wire melts due to the rotating of the arc and the molten pool becomes unstable due to excessive pressure of the arc. When the welding current (I) is lower than the lower limit defined by the formula:

$$500d - 150$$

the electrical current is insufficient to provide enough pinch force, and the high efficiency of welding for the production of pipe is not achieved. In other words, below the lower limit the melting rate of the wire is too low to achieve a high welding efficiency.

The diameter of the electrode wire is from 0.8 to 2.4 mm for the following reasons. When the diameter of the welding wire is greater than 2.4 mm, the electrical resistance heat generated in the wire tip is considerably lower than that in a wire with a diameter of less than 2.4 mm. The deposition rate is desirably increased at a rate proportional to the welding current when the wire diameter is 2.4 mm or less according to the present invention, as explained later. However, such a desirable increase is not achieved with a wire diameter above 2.4 mm. In addition, although the pinch force is desirably increased in such a manner as to stabilize the arc according to the present invention, such desirable increase is not achieved with a wire diameter above 2.4 mm. On the other hand, when the welding wire diameter is less than 0.8 mm, the maximum allowable electrical current is too low to achieve a high deposition rate of the wire. Furthermore, when a wire of less than 0.8 mm is fed at a high speed, trouble such as the buckling of the wire is liable to take place, and therefore, it is questionable whether the welding can be stably carried out on an industrial scale. A wire diameter from 1.2 to 1.6 mm is preferable.

Figure 2:
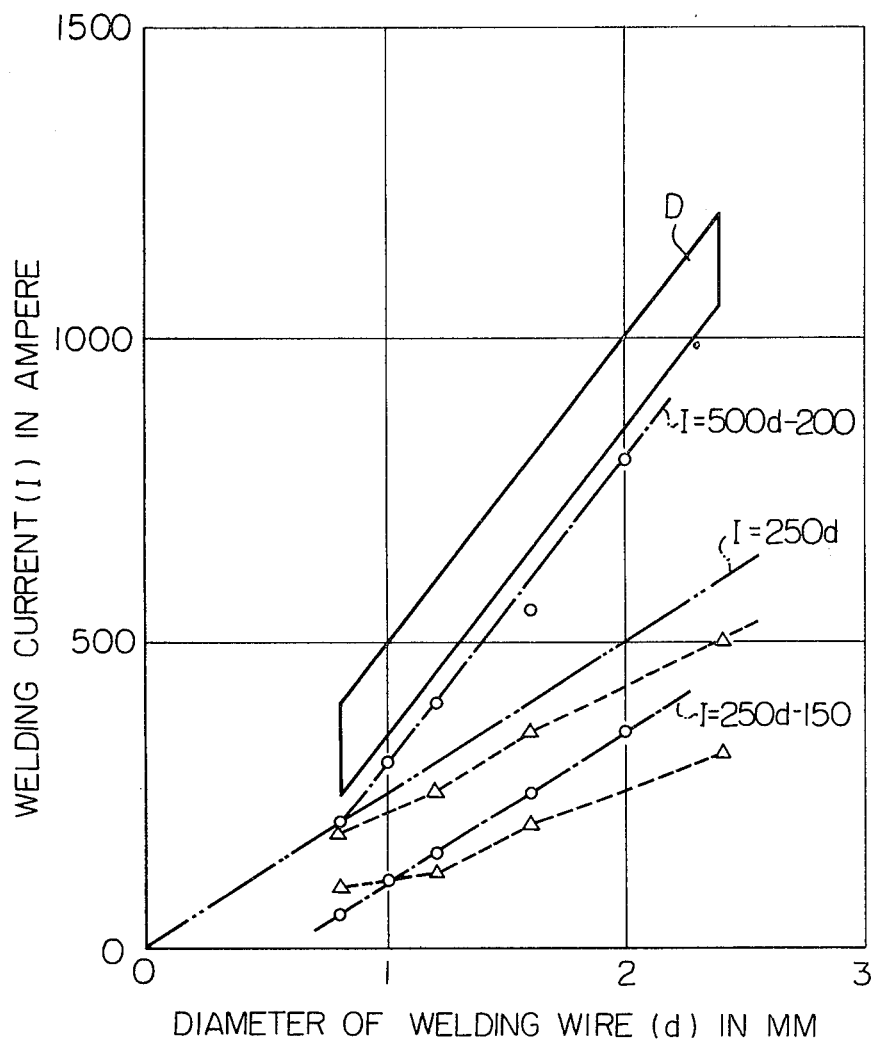

The advantages of a high current density can be fully utilized without inducing rotation of the arc, due to the fact that the shielding gas mixture is used for the welding atmosphere and, further, the current range denoted by D in FIG. 2, which has previously not been used, is used.

Figure 4:
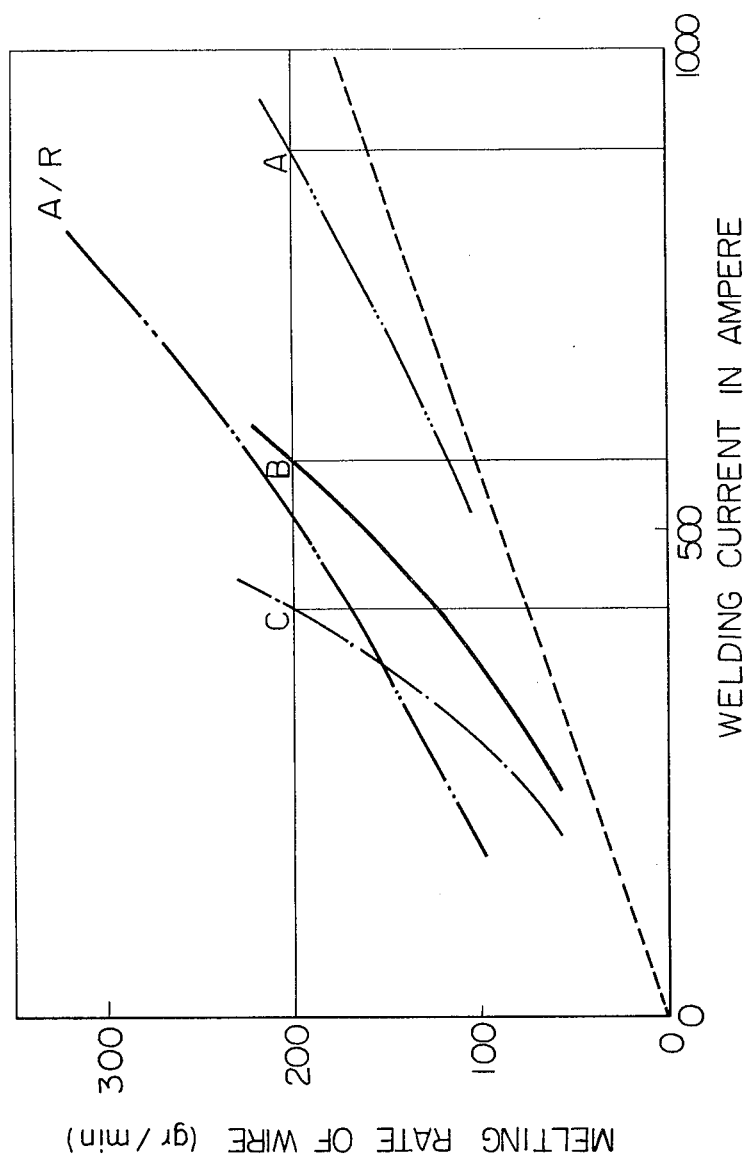
FIG. 4 is a graph which shows the relationship between the welding current (I) and the melting rate of the wire per unit time, which relationship clarifies the dependance of the resistance heating effect upon the wire extension.

According to the present invention, the distance between the front end of the current contact tip and the bottom of the groove, i.e. the wire length in mm, is specified by the relationship:

$$l > 10d + 5 \tag{2},$$

wherein the value d designates the diameter of the wire in mm. A significance of welding with a small diameter wire is that the rate of metal deposition per unit time, hereinafter referred to as the deposition rate, deviates from a direct proportional relationship to the welding current and increases faster than a direct proportional relationship when the welding current is increased. This phenomenon is understood to result from the resistance heating in the wire tip due to the welding current. In FIG. 4, the effect of the length of the wire on the deposition rate of the small diameter wire is schematically illustrated by the solid line and the one dot chain line, indicating a smaller and larger wire length, respectively. However, with regard to the large diameter wire, the heating effect at the wire tip is so small that the relationship between the deposition rate and the welding current only slightly exceeds the direct proportional relationship represented by the dotted straight line, as seen from the three dot chain line. In order to ensure a high deposition rate for high efficiency welding with a large diameter wire, the current must, therefore, be increased, for example, up to point A in FIG. 4, with the result being that instability of the arc, such as a magnetic blow, is caused. In addition, the low current density, as described above in connection with the Japanese Laid Open Patent Specification No. 51-61452, is a reason for arc instability. On the other hand, with regard to the small diameter wire, even with a conventional length (l) the resistance heating effect can be observed, as can be understood from the solid line and point B, although the electrical current value is still high. However, when the length is based on the formula $l > 10d + 5$ according to the present invention, the electrical current is reduced, as indicated by the one dot chain line and the point C in FIG. 4. Such a low electrical current as that at the point C is more advantageous for the stabilization of the arc and the bead shape than that at the point B. In addition, as stated above, the current density and thus the pinch force, of the small diameter wire at the current of point C is far greater than that of the large diameter wire at the current of point A. Accordingly, a deep penetration effect is produced even when the welding arc is oscillated at high frequency by oscillating the electrode wire at high frequency. For the reasons stated above, the wire length l is required to be larger than $10d + 5$, wherein the value "d" is the diameter of the wire in mm. The wire length should preferably be limited to a value below a value which would bring about excessive softening of the wire and an abnormal arc oscillation due to the oscillation at high frequency which is occasionally carried out. The maximum wire lengths (l) for wire diameters of 1.2 mm and 2.4 mm are 30 mm and 50 mm, respectively.

In the conventional MIG welding process using a small diameter wire, wherein argon gas having oxygen mixed therewith in an amount of from 1 to 2% is used as the shielding gas, the welding current which is used for stable welding for a given wire length has been experimentally determined not to exceed the maximum value defined by the two dot chain line denoted as A/R in FIG. 4. This line represents the maximum melting rate at which the MIG-welding arc produces a stable axial spray transfer, and above which a rotating spray is generated. However, when the shielding gas atmosphere of mixed gases, described above, is used in accordance with the present invention, the rotating-spray arc is suppressed even at electrical current values exceeding the critical value of the A/R line, and a high welding current can, therefore, be used, and a stable arc is generated. The shielding gas contains from 5 to 30%, preferably from 10 to 20%, by volume of the carbon dioxide gas, and inert gas is essentially in balance with the carbon dioxide gas and may contain a minor amount of oxygen. The welding voltage may be selected from within an optional range, for example a range of from 30 to 40 V, but is preferably a high voltage, for example ranging from 37 to 40 V, in order to increase the width of the bottom of the penetration portion at the root face 3 (FIG. 1(A)) to an extent allowable for the welding.

According to a preferred embodiment of the present invention, the current contact tip is oscillated, thereby oscillating the arc at a high frequency in a direction transverse to the weld line. As a result, a flat bead is produced and an excellent wide penetration can be achieved. The zone of the base metal heated by the arc is extended and the shape of the penetration portion is made wider by oscillating the arc at a high frequency in order to attain excellent fusion at the root face and an excellent toe of the weld. That is, as seen in FIG. 3(B), the current contact tip (16) is oscillated at a high frequency of three times or more per second (Hz), between the positions indicated by the solid and dotted lines, so that the arc is oscillated in the direction perpendicular to the weld line. The width of the penetration portion is then increased, while the depth of the pentration of the bead due to the high current density of the arc is decreased. Despite this decrease, when a high current density arc is used, the depth of the penetration is sufficient for fusing the root face (3) of the pipe, without forming a root gap between the ends of the base metal. In addition, the penetration portion is caused to spread in the width direction thereof. Accordingly, the shape of the thus obtained penetration portion is suitable for the entire root face (3). In addition, since the oscillation at high frequency increases both the zone of the base metal (1) heated by the arc and the dispersion zone of the molten metal supplied from the wire (13), and further, since the force of the arc being applied to the molten metal is dispersed, a superior toe of the weld is formed. In the welding of thick plate at high welding speed and low welding heat input, hot cracking of the beads is generally caused, due to rapid cooling. However, such problem is solved by the improved bead shape and penetration. In order that no zigzag shape of the penetration portion be caused at a high welding speed, and also, in order that the arc force be smoothly applied to the wide zone of the molten metal in the groove, the oscillation frequency is required to be not less than three Hz. The oscillation frequency is required to be not more than thirty Hz, in order that the molten metal at the front end of the wire will be stably transferred to the base metal. The oscillation frequency is preferably from 5 to 20 Hz. The oscillation amplitude is from 1 to 15 mm for the following reasons. At less than 1 mm, the width of the penetration portion cannot effectively be increased, while above 15 mm the prepared edge is excessively melted so that welding defects are liable to be formed on the toe of the first welding layers. The effects of the oscillation imparted to the current contact tip in the direction transverse to the weld line are equally obtained by oscillation wherein the end of the current contact tip moves in a circle or psuedo circle during one cycle of the oscillation while the tip is advancing along the weld line. The path of the oscillation at high frequency is not limited to any particular pattern as long as the pattern has a component traversing the weld line.

The SR embrittlement can be effectively prevented, according to another preferred embodiment of the present invention, by making the length of the root face and the angle of the groove at the root proper. The SR brittleness, which results from an appreciable dilution of the weld metal in the first layers of the base metal, can be prevented effectively when GMA welding is performed under the shielding atmosphere of the gas mixture described above, so as to form the first welding layers in the double groove, which has, according to another preferred embodiment, a thickness of the root face ranging from 3 to 8 mm and a groove angle at the groove bottom ranging from 45° to 160°. Generally speaking, the precipitation hardening elements enter into the weld metal of the first layers due to the dilution by the base metal and cause the SR brittleness. When the SAW process is used for to the welding of the first layers, the amount of dissolved oxygen and phosphorous, which promote SR embrittlement, tend to be high in these layers. When the GMA welding is used for the welding of the first layers, the amounts dissolved oxygen and phosphorous are reduced and SR embrittlement can advantageously be reduced.

In general, if the thickness of the root face exceeds 8 mm, the bead is formed in a pear shape as seen in FIG. 1(A). However, with such a bead shape hot cracking may oscasionally be caused. On the other hand, when the root face is less than 3 mm, such difficulties as burn-through may result, even though tack welding has been carried out.

A small groove angle is advantageous for the welding efficiency, but with a groove angle of less than 45°, the bead becomes pear shaped and a welding crack may, therefore, be generated when the first layer is formed. On the other hand, with a groove angle over 160°, the amount of penetration is increased but the welding efficiency is considerably reduced due to the increase in the cross sectional area of the groove. It is desirable to adopt the groove shape as shown in FIG. 8 to reduce the cross-sectional area to an area as small as possible from the point of view of welding efficiency by the SAW process. It is obvious from FIG. 8 that the groove angle at the surface of the edges being welded by the SAW process may be less than 45°, but the groove angle at the bottom of the groove should be 45° or more.

Finally, the welding of the last layer will be described. Although the GMA welding process according to the present invention, as described above, provides a bead in the first layer which is free from welding cracks and which has a deep penetration, the bead shape presents a problem because the groove is widened at a position close to the surface of the pipe when the GMA welding is used for the welding of the last layer. Beads which are convex and narrow are liable to be obtained, because in general, the GMA welding process provides an inferior toe of the weld as compared with the SAW process, and also due to the ability of the high current density arc of the GMA welding process to carry out melting, which ability is great in the depth-direction but small in the width-direction of the arc.

TIG welding is not as practical for the welding of the last layer as the SAW process, because there is not enough reinforcement of the weld for a thick wall pipe with TIG welding, and further, the welding properties of welds formed by TIG welding at high speed are inferior to those formed by the SAW process.

In summary, the advantages of the SAW process as compared to those of GMA welding are that: a wide bead having a shallow penetration can easily be formed due to the spread of the arc, which has a low current density; and according to the characteristics of the slag shield type welding, the toe of the weld is excellent and a smooth bead can easily be obtained.

For the purpose of reducing the cooling rate by increasing the welding heat input during the welding of the last layer, within the limits of insuring the toughness, the SAW process, which enables welding to be carried out with a welding heat input ranging from 25 to 45 KJ/cm, must be used for the last layer. Also, for the purpose of mitigating an undesirable increase of the hardness in the weld zone, which increase results from the low welding heat input to each welding layer and, thus, from a high cooling rate by the use of the GMA welding of the present invention, the SAW process must be used for the last welding layer, thereby annealing the previous layers.

As explained above, a weld zone of a steel pipe, particularly a thick wall steel pipe, having an improved quality can be provided, according to the present invention, by using GMA welding with high melting rate, and preferably a high frequency oscillation, for the welding of the first layers, and by using the SAW process for the welding of the last layers. The present invention is, therefore, characterized by the selection of the welding processes for forming the first and last layers of a steel pipe, particularlly a thick wall steel pipe. Namely, in FIG. 6, the intermediate layers 6 and 9 may be formed by any welding process, such as an ordinary GMA process, which causes no welding problems, provided that the welding of the first layers is carried out by using GMA welding with high melting, and preferably with high frequency oscillation, according to the present invention. However, it is desirable, from the point of view of welding efficiency and quality, to use the GMA welding process according to the present invention for the welding of intermediate layers. When an ordinary GMA welding process is used for to the intermediate layers, the beads are liable to have a convex shape with a small width. If a SAW process is carried out after this GMA welding process, there is liable to be a lack of fusion 12 (FIG. 5) at the toe of the weld bead formed by the ordinary GMA process. However, such welding defect can be prevented by giving the bead a thickness P when carrying out the SAW weld which is at least 8 mm, and preferably more than 10 mm. When the bead thickness P is 7 mm or less, a lack of fusion may result. Sufficient toughness $vE-60 = 3.5$ Kg.m of the weld metal and heat affected zone of the last layers cannot be achieved due to excessive welding heat input when the bead thickness P is 8 mm or more.

The GMA and SAW processes according to the present invention can be applied to production of large diameter steel pipes which are required to possess an excellent toughness at low temperature. It is, however, desirable to apply these processes to the production of thick wall steel pipes having a thickness of not less than one half inch (12.7 mm), and particularly one inch (25.4 mm) or more. These welding processes can be used in the production line of a UOE process, a spiral process and a bending roller process, which are not described in detail herein becuase they are well known. The materials of the steel pipe may be ordinary, for example as stipulated in the API Standard 5L, or may be special. Using the process of the present invention, it is possible, in pipes for a pipeline and a pipe structure constructed at sea, to reduce the stress concentration at the toe of weld and to enhance the fatigue resistance.

The present explanation will now be further explained in detail by way of the following Examples.

EXAMPLE 1

A steel pipe having an outer diameter 104 cm (41 inches), a wall thickness of 25 mm and a designation of X-65 was produced and tested. The composition of the steel plate was as shown in Table I.

TABLE I

| Steel Grade | chemical composition Contents (wt %) | | | | | | | |
|---|---|---|---|---|---|---|---|---|
| | C | Si | Mn | P | S | Ni | V | Nb |
| X-65 | 0.06 | 0.20 | 1.35 | 0.0001 | 0.004 | 0.25 | 0.14 | 0.03 |

The groove shape shown in FIG. 7 and Table II was formed at the abutted ends of a steel plate. After tack welding, GMA welding with high frequency oscillation and a SAW process according to the present invention, as well as the MIG welding with a small diameter wire and small current, were carried out under the conditions specified in Table II.

TABLE II

| Groove Shape (mm) | Conventional t = 25 mm $t_2 = t_1 = 11$ mm R . F = 3 mm $\theta_1 = \theta_2 = 60°$ | Invention t = 25 mm $t_1 = t_2 = 10$ mm R . F = 5 mm $\theta_1 = \theta_2 = 60°$ | |
|---|---|---|---|
| Welding Process | MIG | GMA process | tandem type SAW process |
| Diameter of electrode wire (mm) | 1.2 | 1.2 | 4.0 |
| Wire extension (Distance between Tip and Base Metal) (mm) | 15 | 20 | 35 |
| Shielding method | Ar + $CO_2$(20%), 30 l/min. | Ar + $CO_2$(20%) 50 l/min. | High basicity-, melt type flux |
| Welding voltage (V) | 30 | 36 | 30/32 |
| Welding current (A) | 260 | 550 | 720/660 |
| Travel rate (cm/min) | 30 | 60 | 60 |
| Welding heat input (kJ/cm) | 16.8 | 19.0 | 42.7 |
| Oscillation cycle of electrode (Hz) | — | 15 | — |
| Width of electrode oscillation | — | 3 | — |
| Number of pass (times per one side) | 4 | 1 | 1 |
| Penetration depth of 1st layer (mm) | 3 | 6 | — |
| Welding time (relative to SAW process) | 5 | 0.5 | 0.5 |
| Toughness vE-20 (kg-m) - Weld metal as welded | 14.2 | 15.7 | 12.1 |

TABLE II-continued

|  | Conventional<br>t = 25 mm<br>$t_2 = t_1 = 11$ mm<br>R . F = 3 mm<br>$\theta_1 = \theta_2 = 60°$ | Invention<br>t = 25 mm<br>$t_1 = t_2 = 10$ mm<br>R . F = 5 mm<br>$\theta_1 = \theta_2 = 60°$ | |
| --- | --- | --- | --- |
| Groove Shape (mm) | | | |
| Welding Process | MIG | GMA process | tandem type SAW process |
| - Weld metal after, 600° C. × 1 hr SR | 12.1 | 14.3 | 11.0 |
| - HAZ as welded | 20.3 | 21.4 | 21.9 |
| Bead thickness/Bead width (mm) | — | — | 9/20 |

The composition of the welding wire used was as shown in Table III, below.

TABLE III

| Wire | Chemical Composition Contents (wt %) | | | | | |
| --- | --- | --- | --- | --- | --- | --- |
|  | C | Si | Mn | P | S | Cu |
| Small diameter wire 1.2 mm in diameter | 0.11 | 0.68 | 1.34 | 0.009 | 0.005 | 0.26 |
| Wire for SAW 4.0 mm in diameter | 0.12 | 0.05 | 1.9 | 0.008 | 0.004 | 0.30 |

The flux used in the experiment of the present Example during the SAW process of the surface layer was a basic, melt type, with $SiO_2$—CaO—$TiO_2$—$CaF_2$ as major components. The results of the welding are illustrated in the lower six lines of Table II. As seen from Table II, the welding efficiency is considerably improved by the present invention as compared with conventional MIG welding with a small diameter wire. The GMA welding process according to the present invention would be more efficient than the SAW welding process, if the two processes were compared to one another on the presumption that their welding heat inputs are equal. The penetration according to the present invention is high. A root face with a 5 mm thickness could, therefore, be used according to the present invention, while a root face of only 3 mm thickness could be used with a conventional GMA welding process with a small diameter wire, because of low penetration and weld crack. The low welding efficiency of the ordinary GMA process is associated with the thin root face and, thus, the large cross sectional area of the grooves.

In addition, the beads obtained with the method of the present invention had an excellent bead shape and sufficient width as compared to those obtained with a conventional GMA welding process. This is because of the fact that the SAW process was used for the last welding layers.

In conclusion, by carrying out the process according to the present invention, a sound weld metal without cracks in the first layers and a homogeneous, smooth surface of beads is provided, and a weld zone of the pipe having improved toughness is produced at a high welding efficiency.

EXAMPLE 2

A steel pipe having an outer diameter of 155 cm (61 inches) and a wall thickness of 34 mm was produced from a 2.5% Ni- Mn- Nb- V-system, low alloyed steel by the process according to the present invention and by a conventional, tandem type SAW process, and then tested. The groove shape shown in FIG. 7 and specified in Table IV was formed on the abutted ends of the steel plate. After tack welding, the two welding processes described above were carried out under the conditions specified in Table IV.

TABLE IV

|  | Conventional<br>t = 32 mm<br>$t_1 = 22$ mm $t_2 = 5$ mm<br>R . F = 5 mm<br>$\theta_1 = 75°$ $\theta_2 = 70°$ | Invention<br>t = 32 mm<br>$t_1 = t_2 = 13$ mm<br>R . F = 6 mm<br>$\theta_1 = \theta_2 = 70°$ | |
| --- | --- | --- | --- |
| Groove Shape (mm) | | | |
| Welding Process | Tandem type-, SAW-process | GMA process | Tandem type-, SAW-process |
| Diameter of electrode wire (mm) | 4.0 | 2.0 | 4.0 |
| Wire extension (Distance between Tip and Base Metal) (mm) | 35 | 27 | 35 |
| Shielding method | High basicity, melt type flux | Ar + $CO_2$(20%), 50 l/min. | High basicity, melt type flux |
| Welding voltage (V) | 31/33 | 36 | 35/42 |
| Welding current (A) | 720/600 | 960 | 900/780 |
| Travel rate (cm/min) | 70 | 100 | 100 |
| Welding heat input (kJ/cm) | 36 | 21 | 38.5 |
| Oscillation cycle of electrode (Hz) | — | 10 | — |
| Width of electrode oscillation | — | 4.5 | — |
| Number of pass (times per one side) | 11 | 4 | 2 |
| Penetration depth of 1st layer (mm) | 4 | 6 | — |
| Back chipping | Necessary | No | No |
| Welding Time (relative to SAW process) | 1 | 0.3 | 0.3 |
| Toughness vE-20 (kg-m) | | | |
| - Weld metal as welded | 10.4 | 12.5 | 11.5 |
| - Weld metal after 600° C. × 1 hr SR | 4.8 | 10.3 | 7.3 |
| - HAZ as welded | 16.2 | 18.0 | 16.7 |
| Bead thickness/Bead width (mm) | 9/30 | — | 10/32 |

The compositions of the wires used were as shown in Table V.

TABLE V

| Wire | Chemical Composition Contents (wt %) | | | | | | | |
|---|---|---|---|---|---|---|---|---|
| | C | Si | Mn | P | S | Ni | Mo | Cu |
| Small Diameter wire 2.0 mm in Diameter | 0.04 | 0.39 | 0.85 | 0.003 | 0.004 | 3.5 | 0.30 | 0.01 |
| Wire for SAW 4.0 mm in Diameter | 0.07 | 0.14 | 1.50 | 0.004 | 0.004 | 3.5 | 0.30 | 0.01 |

The flux used in the present Example during the SAW process was a basic, melt type, with $SiO_2$—$CAO$—$TiO_2$—$CAF_2$ as the major components.

As is clear from Table IV, the welding efficiency is improved by the process according to the present invention as compared with the conventional, tandem type SAW process. The advantages of the process according to the present invention are that: firstly, the root face can be thick due to deep penetration during welding, with the result that the cross sectional area of the grooves can be reduced; secondly, the melting rate of the wire is high, although the welding heat input is low, with the result that the number of welding passes can be reduced; and thirdly, SR embrittlement is not likely to occur, due to the low welding heat input, although the dilution of the weld metal in the first layers by the base metal is large. Back chipping is not necessary because of the non occurrence of the SR embrittlement.

Cracks in the first layer were not observed after the completion of welding, although the thickness of root face was as large as 6 mm. The bead surface turned out to be excellent after the completion of welding, since the SAW process was used jointly with the GMA welding process for the last layers.

EXAMPLE 3

The steel pipe of Example 1 was produced, except that the high frequency oscillation was not performed during the GMA welding. The conditions for producing the pipe were as shown in Table VI. The production conditions not specified in Table VI were the same as in Example 1.

TABLE VI

| Groove Shape (mm) Welding Process | Conventional t = 25 mm $t_1 = t_2 = 11$ mm R . F = 3 mm $\theta_1 = \theta_2 = 60°$ MIG process with small diameter wire and low current | Invention t = 25 mm $t_1 = t_2 = 10$ mm R . F = 5 mm $\theta_1 = \theta_2 = 60°$ | |
|---|---|---|---|
| | | GMA process (without oscillation) | Tandem type SAW process |
| Diameter of electrode wire (mm) | 1.2 | 1.2 | 4.0 |
| Wire extension (Distance between Tip and Base Metal) (mm) | 15 | 20 | 35 |
| Shielding method | Ar + $CO_2$(20%), 30 l/min. | Ar + $CO_2$(16%), 40 l/min. | High basicity melt type flux |
| Welding voltage (V) | 30 | 38 | 30/32 |
| Welding current (A) | 260 | 530 | 720/660 |
| Travel rate (cm/min) | 30 | 60 | 60 |
| Welding heat input (kJ/cm) | 15.6 | 20.1 | 42.7 |
| Number of pass (times per one side) | 4 | 1 | 1 |
| Penetration depth of 1st layer (mm) | 3 | 6 | — |
| Welding time (relative to SAW process) | 5 | 0.5 | 0.5 |
| Toughness vE-20 (kg-m) | | | |
| - Weld metal as welded | 14.2 | 15.5 | 12.4 |
| - Weld metal after 600° C. × 1 hr SR | 12.1 | 14.4 | 11.2 |
| - HAZ as welded | 20.3 | 21.7 | 21.5 |
| Bead thickness/Bead width (mm) | — | — | 9/20 |

As is clear from Table VI, the welding results obtained in the present Example are substantially the same as those in Example 1.

What we claim is:

1. A welding process for the production of a steel pipe comprising the step of:
    abutting the chamfered ends of a steel plate bent into the shape of a pipe to define a grooved joint with the groove opening upwardly;
    welding said joint by the steps of:
    forming at least a first welding layer in said joint by carrying out a gas metal arc welding process on said joint with said joint underlying the welding apparatus and carrying out said process under an atmosphere of shielding gas which is a mixture containing mainly an inert gas and carbon dioxide and (1) utilizing a high electrical current I in amperes in the range defined by the formula:

$$500d \geq I \geq 500d - 150$$

wherein d is the diameter of the welding wire in mm, and with a diameter of the welding wire in the range of from 0.8 to 2.4 mm, whereby the generation of a rotating arc is suppressed due to the current flowing through the wire within said gas mixture and an arc is generated which is sufficiently stiffened by the pinch force due to the high current density to ensure the resistance of the arc to deflection of the arc by magnetic blow, and the penetration of the base metal is enhanced, and (2) making the length l in mm of the welding wire between the end of a current contact tip of the welding apparatus and the bottom of the grooved joint according to the formula:

$$l > 10d + 5$$

whereby the deposition rate of molten metal is increased; and thereafter forming the last welding layer in said joint by carrying out a submerged arc welding on said joint.

2. A process according to claim 1 further comprising while carrying out said gas metal arc welding process, oscillating the arc in a direction transverse to the weld line at a rate of from 3 to 30 Hz and an amplitude of from 1 to 15 mm.

3. A process according to claim 1 further comprising forming at least one intermediate later between said first and last welding layers by a gas metal arc welding process comprising (1) using a high electrical current (I) in amperes in the range defined by the formula:

$$500d \geq I \geq 500d - 150$$

wherein d is the diameter of the welding wire in mm, and with a diameter of the welding wire in the range of from 0.8 to 2.4 mm, whereby the generation of a rotating arc is suppressed due to the current flowing through the wire within said gas mixture and an arc is generated which is sufficiently stiffened by the pinch force due to the high current density to ensure the resistance of the arc to deflection of the arc by magnetic blow, and the penetration of the base metal is enhanced, and (2) making the length l in mm of the welding wire between the end of a current contact tip of the welding apparatus and the bottom of the grooved joint according to the formula:

$$l > 10d + 5$$

whereby the deposition rate of molten metal is increased; and thereafter forming the last welding layer in said joint by carrying out a submerged arc welding on said joint.

4. A process according to claim 2, wherein said oscillation rate is from 5 to 20 Hz.

5. A process according to claim 1, wherein the wire diameter is from 1.2 to 1.6 mm.

6. A process according to claim 1, wherein said gas mixture contains from 5 to 30% of carbon dioxide and the inert gas is essentially in balance.

7. A process according to claim 1, wherein said steel pipe has a wall thickness of not less than approximately 12.7 mm.

8. A process according to claim 7, wherein said steel pipe has a wall thickness of not less than approximately 25.4 mm.

9. A process according to claim 7, wherein said groove has an angle of from 45° to 160° at the root thereof and the root face formed by said abutted ends is from 3 to 8 mm long.

* * * * *